United States Patent [19]

Presholdt

[11] E Patent Number: Re. 33,276

[45] Reissued Date of Patent: Jul. 24, 1990

[54] METHOD AND APPARATUS FOR SEPARATELY CONTROLLING SKY WAVE AND GROUND WAVE RADIATION FROM A MEDIUM WAVE ANTENNA

[76] Inventor: Ogden L. Presholdt, 214 Laurel Hollow Dr., Nokomis, Fla. 34275

[21] Appl. No.: 219,006

[22] Filed: Jul. 14, 1988

Related U.S. Patent Documents

Reissue of:

[64] Patent No.: 4,731,615
Issued: Mar. 15, 1988
Appl. No.: 777,252
Filed: Sep. 18, 1985

[51] Int. Cl.[5] ..... H01Q 21/00

[52] U.S. Cl. ..... 343/725; 343/727; 343/853

[58] Field of Search ..... 343/725, 727, 853, 832, 343/729, 730, 828, 703, 857, 846, 874, 705, 806; 342/451, 420, 448, 361

[56] References Cited

U.S. PATENT DOCUMENTS

| | | | |
|---|---|---|---|
| 1,853,021 | 4/1932 | Alexanderson | 343/361 X |
| 1,863,518 | 1/1932 | Young | 343/361 |
| 1,909,937 | 5/1933 | Eckersley | 343/853 |
| 1,912,754 | 6/1933 | Böhm et al. | 343/826 |
| 2,048,726 | 7/1936 | Böhm | 343/828 |
| 2,083,260 | 6/1937 | Godley et al. | 343/828 X |
| 2,195,232 | 3/1940 | Wells et al. | 343/826 |
| 2,283,617 | 5/1942 | Wilmotte | 343/725 |
| 2,516,706 | 7/1950 | Laport | 343/806 |
| 3,562,755 | 2/1971 | Bonadio | 343/853 |
| 3,761,940 | 9/1973 | Hollingsworth | 343/830 X |
| 4,325,141 | 4/1982 | Ghose | 343/705 X |
| 4,670,760 | 6/1987 | Biby | 343/832 |

*Primary Examiner*—Eugene R. LaRoche
*Assistant Examiner*—Seung Ham
*Attorney, Agent, or Firm*—Fleit, Jacobson, Cohn, Price, Holman & Stern

[57] ABSTRACT

In one embodiment, a horizontal antenna mounted electrically separated from but near the top of a vertical antenna. For a given wattage and frequency and for two stations separated a known distance apart, the proscribed angle of elevation for ionospheric reflection for each station can be computed. The current and phase of the signal applied to the horizontal antenna can be adjusted to cancel the electromagnetic field waves emitted from the vertical antenna in the selected azimuth and angle of elevation. The cancellation effects waves of a certain angular orientation at the proscribed angle of elevation for ionospheric reflection.

15 Claims, 7 Drawing Sheets

METHOD AND APPARATUS FOR SEPARATELY CONTROLLING SKY WAVE AND GROUND WAVE RADIATION FROM A MEDIUM WAVE ANTENNA

Matter enclosed in heavy brackets [ ] appears in the original patent but forms no part of this reissue specification; matter printed in italics indicates the additions made by reissue.

BACKGROUND OF THE INVENTION

The present invention relates to a means for separately controlling the electromagnetic radiation, and specifically radio frequency (RF) radiation, in the horizontal direction and at angles of elevation above the horizon from an antenna by means of both horizontally and vertically oriented wires or other conductors each of which is properly energized.

The present invention further provides means for combining groups of wires or conductors arranged vertically, horizontally or at slant angles so as to generate radiation patterns in the horizontal direction to produce a ground wave signal that appropriately serves certain areas while separately controlling the antenna radiation pattern at angles above the horizontal (at elevations) so as to minimize the sky wave signal and thus limit the sky wave interference to the service areas of other stations.

In the medium wave AM radio band (300–3000 kHz) directional antennas are frequently used both to provide service to specified areas and to minimize interference with other radio stations. There are two basic modes of radio wave propagation which occur at these frequencies. During both the daytime and nighttime a ground wave signal is propagated. This ground wave signal is normally the desired received signal. Further, during the nighttime, a second method of propagation occurs; a signal is reflected from the ionosphere and returns to earth at significant distances from the transmitting station with substantially less attentuation than that suffered by the ground wave, thus causing more interference to other stations during the nighttime. Conventional directional antennas suppress both the ground wave and sky wave signals and consequently the service area may be reduced and some desired service may be lost in order to minimize sky wave interference to other stations.

OBJECTS OF THE INVENTION

It is an object of this invention to provide an antenna system which controls the sky wave in a predetermined direction such that nighttime interference to other radio stations is reduced while maintaining maximum possible ground wave service in that direction.

It is a further object of the present invention to provide a system which can be customized to limit sky waves in multiple directions while maintaining maximum ground wave service in those directions.

SUMMARY OF THE INVENTION

In one embodiment, a horizontal antenna is mounted electrically separated from but near the top of a vertical antenna. For a given wattage and frequency and for two stations separated a known distance apart, the proscribed angle of elevation for ionospheric reflection for each station can be computed. The current and phase of the signal applied to the horizontal antenna can be adjusted to cancel the electromagnetic field waves emitted from the vertical antenna in the selected azimuth and angle of elevation. The cancellation effects waves of a certain angular orientation at the proscribed angle of elevation for ionospheric reflection.

BRIEF DESCRIPTION OF THE DRAWINGS

The subject which is regarded as the invention is particularly pointed out and distinctly claimed in the concluding portion of the specification. The invention, however, together with further objects and advantages thereof, may best be understood by reference to the following description taken in conjunction with the accompanying drawings in which:

DETAILED DESCRIPTION OF THE DRAWINGS

Figure 1:
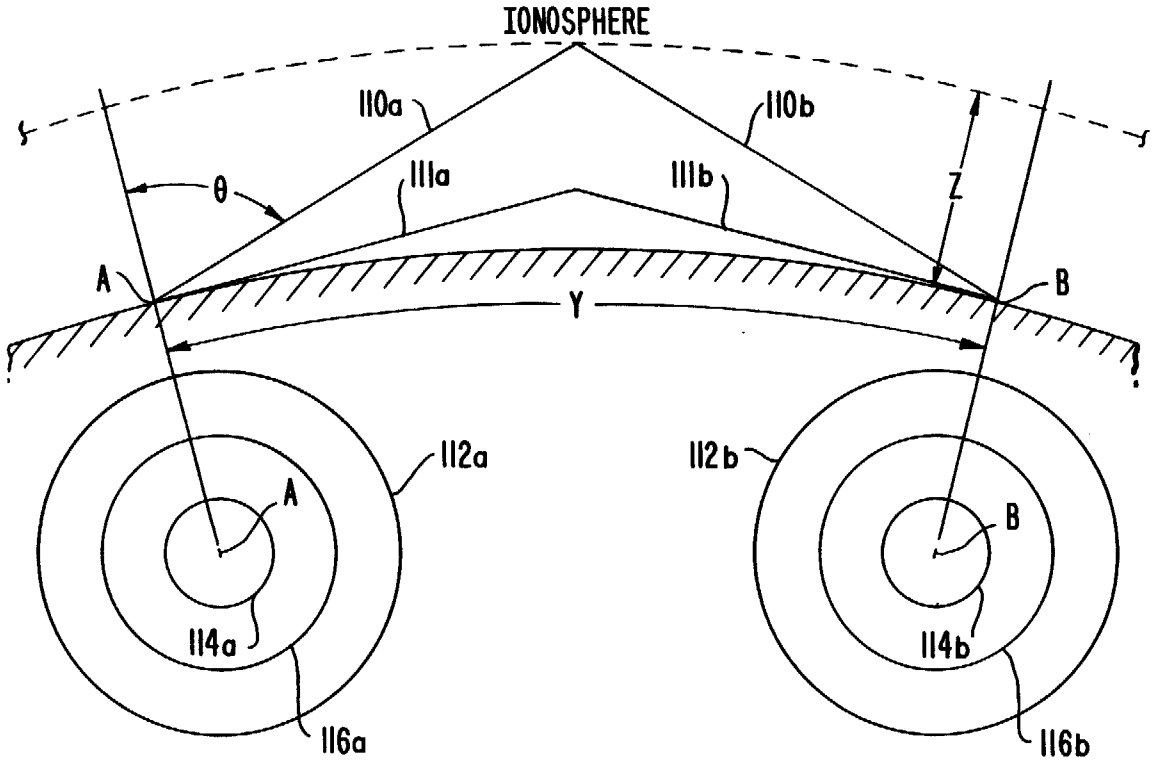
FIG. 1 shows an example of the service areas for two stations and particularly shows the typical loss of nighttime service for a broadcast station in the medium wave band and the gain in nighttime service that results from the use of an antenna as per this invention.

FIG. 1 illustrates the fundamental problem of nighttime, sky wave interference along exemplary path 110*a, b*, between radio stations A and B in the medium wave band which the present invention will reduce or limit due to the use of a transmitting antenna which uses an appropriate combination of vertical, horizontal and slant wires to control the radiation in the sky wave mode. Lines 111*a* and *b* are tangent to the earth. During the day, the ionosphere (at an estimated height z of 110 Km) absorbs the sky wave radiation, hence sky wave interfence along path 110*a, b* does not exist. The present invention encompasses the concept of utilizing vertical, horizontal and slant antenna wires in a defined combination to separately control the ground wave transmission and the sky wave transmission, and encompasses specific antennas which use that principle in the reduction of interference between radio stations.

The illustration in FIG. 1 is based on the calculated performance of two radio stations A and B operating with a power of 1000 watts on a frequency of 1 mHz with a vertical antenna of 190 degrees electrical height and located in an area of average earth constants with a conductivity of 10 millimhos per meter and a dielectric constant of 15. Stations A and B are separated distance Y by 260 miles (418 km). For these conditions, each station has a daytime interference free signal 112*a* and *b* of adequate field strength (0.5mV/m) to provide a service range of 60 miles (97 km). With the vertical antenna only (non directional), the nighttime interference free signal 114*a* and *b* (as computed by Federal Communications Commission standards) has a range of only 17.5 miles (28 km). The reduction of sky wave signal by means of this invention significantly reduces the sky wave interference along path 110*a, b* and the interference is minimized.

Figure 3:
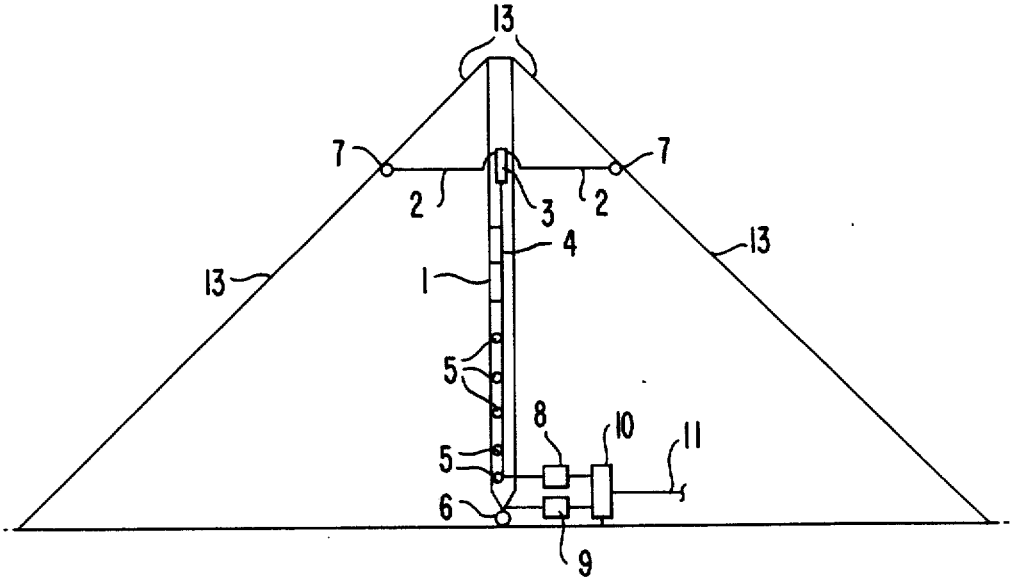
FIG. 3 shows one embodiment of the invention.

With the use of one embodiment of the invention, the combination of vertical and horizontal antennas shown in FIG. 3, and with the same power supplied to the antenna system described above, the interference is reduced such that the nighttime interference service range 116*a* and *b* is now 32.5 miles (52.3 km). Particularly, the sky wave signal along the path 110*a, b* is reduced due to the horizontal antenna having current of the correct amplitude and phase and the antenna being pointed or oriented toward the other station along the Y axis.

In order to illustrate the concept of the present invention, a simple vertical antenna with a center fed, horizontal antenna centered above the mid-height of the vertical antenna will be described. It is known that a base fed, vertical antenna radiates an electromagnetic field which is conventionally identified as vertically polarized. That is, the electric field is oriented at right angles to the direction of propagation and lies in the plane containing the transmitting antenna and the propagation path. It is further known that a center fed, horizontal antenna wire, above ground will radiate an electromagnetic field whose electric field component is at right angles to the propagation path and lies in the plane of the wire and the propagation path.

Figure 2:
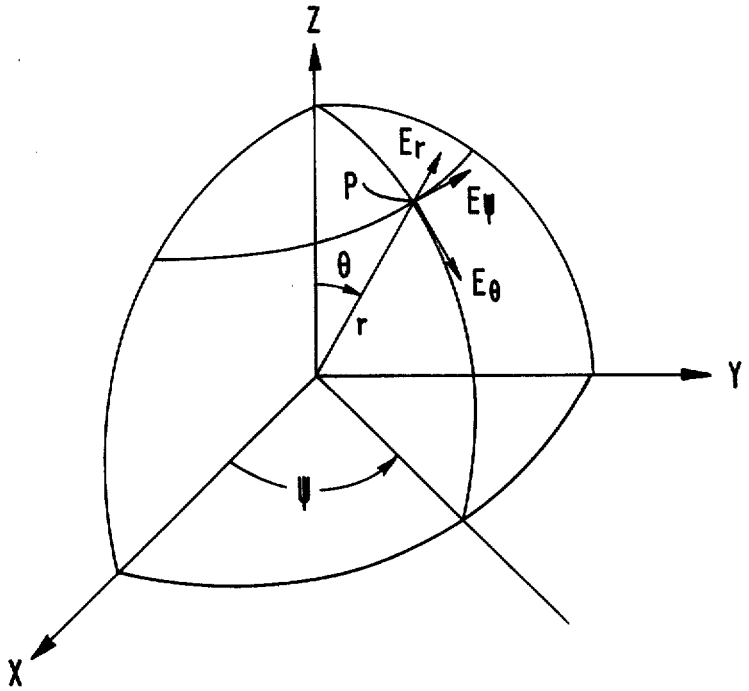
FIG. 2 shows the coordinate systems used to explain the operation of antennas in accordance with the invention.

In order to precisely identify the direction or plane of polarization, it is first necessary to define a set of coordinates systems. (See FIG. 2). The conventional cartesian and spherical coordinates systems with the origin at the base of the vertical antenna and with the X and Y coordinates in the ground plane will be selected. X is toward the observer, Y to the right and Z upward. Further, the center of the horizontal wire will be chosen to be along the positive Z axis, that is, above the origin. Further, in spherical coordinates, the angle $\theta$ will be the angle away from the positive Z axis, that is, toward the horizontal, and the angle $\psi$ will be the angle in the horizontal ground plane counterclockwise from the X axis. The 90° complement of $\theta$ is the angle of elevation. R is the distance to the origin.

The antenna behavior is described in terms of field strengths in the positive $\theta$ and positive $\psi$ direction. The field at point P includes field components $E_\theta$ and $E_\psi$ as well as component $E_r$. Then the radiation from the vertical wire, which was stated to be vertically polarized, is actually polarized in the $\theta$ direction. Further, the polarization of the radiation from the horizontal wire has two components, one in each of the $\theta$ and $\psi$ directions depending on the selection of the observation point P. If the observation point P is selected to be in the Y-Z vertical plane (which contains the horizontal wire), the radiation has only a $\theta$ component. Also, if the observation point is selected to be in the X-Z vertical plane, which is at right angles to the horizontal wire and through its center, the radiation has only a $\psi$ component. For all other locations, there will be both $\theta$ and $\psi$ components of radiation.

It is also known that a medium wave, vertically polarized electromagnetic field will readily propagate along the earth away from the antenna, i.e., along the ground plane or surface. Further, it is also known that the horizontally polarized radiation from a horizontal antenna in the medium wave band will not efficiently propagate radially along the surface of a typical highly conducting earth.

FIG. 3 depicts a simple model of an antenna system utilizing a vertical antenna 1, of 190 degrees electrical height, located at the origin of the coordinate system and with a center fed, horizontal antenna 2 centered on the vertical antenna 1 at a height of 145 electrical degrees and aligned parallel to the Y axis. Horizontal antenna 2 is center fed from a matching and balancing network 3. That network is fed by a coaxial transmission line 4 which is isolated from the vertical antenna 1 for the lower 90 electrical degrees by electrical insulated support brackets 5. Vertical antenna 1 is supported by an electrical base insulator 6. The ends of horizontal antenna 2 are supported by electrical insulators 7 and by guy cables 13 which are made of electrically insulative material or other material broken up by suitable insulators. Coaxial line 4, for horizontal antenna 2, is fed from a power and phase control network 8; vertical antenna 1 is fed from matching and phasing network 9; and both of these networks are fed from a combining network 10 which also matches the combined load to the main feed line 11. These circuits are well known to persons of ordinary skill in the art.

For FIGS. 4, 5, 6 and 7, it is assumed that the antenna system as depicted in FIG. 3 is fed with one watt of power which is radiated when the loop current in the vertical antenna is 0.0687 amperes and the horizontal antenna is fed with a loop current of 0.344 amperes at a phase which leads that in the vertical antenna by 90 degrees. The resulting field strengths are the far field values expressed in volts per meter at one meter. Each curve on the graphs represents the field strength for a specified value of the coordinate $\theta$ (the angle down from the zenith) as marked and for the full range of azimuths ($\psi$).

The radiation from an antenna segment (half of a center fed antenna or a wire fed against ground) of any arbitrary orientation can be calculated from the application of the following equation.

Eq.-1:

$$E_{(\theta \text{ or } \psi)} = \frac{\psi OB}{I_o} \{(P(\theta_m, \psi_m))(e^{j(\phi n + (BSN(rn,\theta m \psi n)))})(e^{-jBr_o})(K)\}$$

$$K = \int_0^G e^{jBL_m(rm,\theta m,\psi m)} I_m(L_m) dL_m$$

where

G = total length of antenna $B = 2\pi/\lambda$ ($\pi$ is the wavelength)

$r, \theta, \psi$ are general spherical coordinates $r_o$ is the distance from the antenna reference point to observation point $r_n$, $\theta_n$, $\psi_n$ use the coordinates of base or feed point to the antenna segment under consideration $r_m$, $\theta_m$, $\psi_m$ are the coordinates of a point on the antenna segment under consideration $I_n(L_m)$ is the current at point m on the nth antenna segment $\phi_n$ is phase of the loop current on the nth antenna segment with respect to that of reference antenna segment $Br_o$ is the reference space phase from the origin at the observation point $BS_n(r_n, \theta_n, \psi_n)$ is space phase term at the observation point for the feed point of the nth antenna segment $BL_m(r_m, \theta_m, \psi_m)$ is space phase term for current element (point) on the antenna segment with respect to its feed point $P(\theta_m, \psi_m)$ is the factor to determine the component of the electric field in the direction of the $\theta$ or $\psi$ direction.

In the above general equation, n is the nth antenna being analyzed. The variable m is the point along the antenna segment. $E_\theta$, the electromagnetic field strength in the $\theta$ direction, and $E_\psi$ the field strength in the $\psi$ direction is related by $P(\theta_m, \psi_m)$ which is the projection factor unique to a particular antenna element in the antenna system.

For the example previously described, the radiation from the vertical antenna and the horizontal antenna can be calculated from the following three equations which were obtained by the application of equation 1 to that specific example.

The radiated field strength from the vertical antenna may be calculated from the following expression.

Eq.-2:

$$E_\theta = \frac{j60I_{LV}}{R_o}((\cos(Bh\cos\theta - \cos Bh)) + \sin\theta) \text{ volts per meter}$$

In this and the following equations:

$R, \theta, \psi$ are spherical coordinates $R_o$=distance to observation point

Bh=electrical height of vertical antenna $I_{LV}$=loop current for vertical antenna in amperes B1=electrical length (half of antenna) for horizontal antenna Ba=elevation of horizontal antenna (electrical angle $I_{LH}$=loop current for horizontal antenna in amperes $\phi$=phase of the horizontal antenna loop current with respect to the loop current of the vertical antenna D=distance, transmitter to receiver. The $\theta$ and $\psi$ components of the electric field from the horizontal wire may be calculated from the following expressions.

Eq.-3:

$$E_\theta = \frac{-120\, I_{LH}(M)(N)(U)}{R_o(P)} \text{ volts per meter}$$

where $M=(\cos\phi + j\sin\phi)(\sin(Ba\cos\theta))$ $N=(\cos(B1\sin\theta\sin\psi - \cos B1))$ $U=(\cos\theta\sin\psi)$ $P=(1-\sin^2\theta\sin^2\psi)$.

Eq.-4:

$$E_\psi = \frac{-120\, I_{LH}(M)(N)(V)}{R_o(P)} \text{ volts per meter}$$

where $V=(\cos\theta\cos\psi)$.

Figure 4:
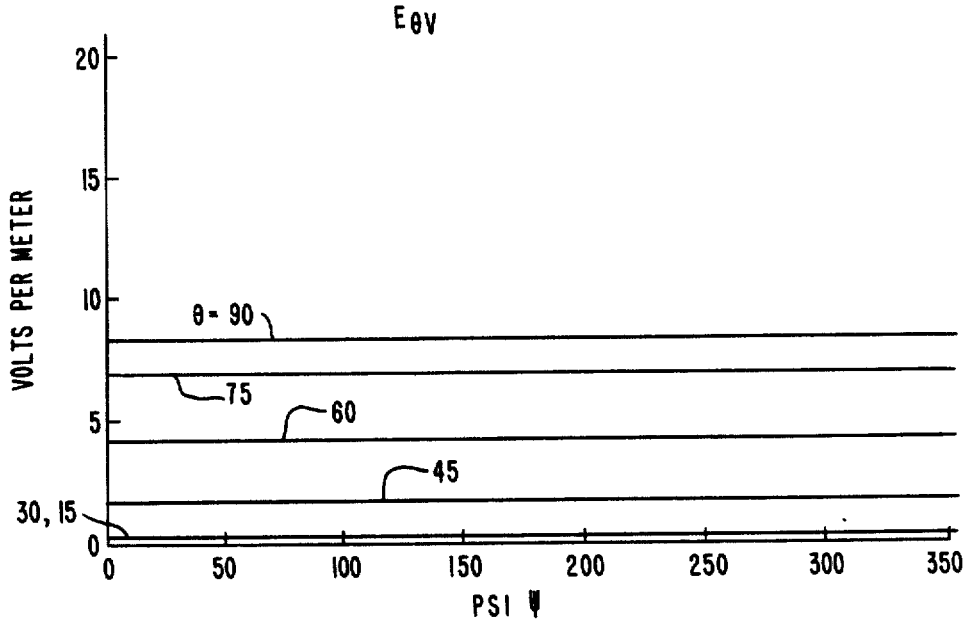
FIG. 4 shows the vertical $\theta$ and $\psi$ distribution of the $\theta$ component of field strength $E_{\theta V}$ from a simple vertical antenna (there is no $\psi$ component of field strength from the vertical antenna)

FIG. 4 shows the component $\theta$ of field strength $E_{74\,V}$ from the vertical antenna alone operating as described above. As shown, $E_{\theta V}$ is constant for all values of $\psi$.

Figure 5:
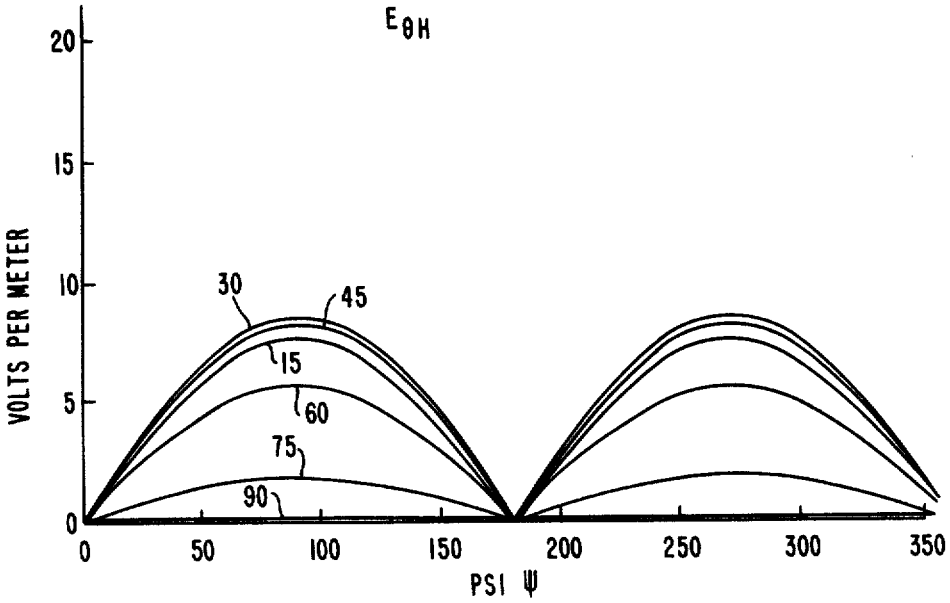
FIG. 5 shows the $\theta$ and $\psi$ distribution of the component of field strength, $E_{\theta H}$ from a short, horizontal, center fed, antenna.

FIG. 5 shows the $\theta$ component of field strength $E_{\theta H}$ from the horizontal antenna alone operating as described above. (Note that the horizontal antenna is oriented in the $\psi$=90° direction.) At $\theta$=90°, there is no radiation at any azimuth $\psi$ degrees. The maximum field strength $E_{\theta H}$ occurs at $\psi$=90° or 270° and approximately at $\theta$=30°. The value of $\theta$ which gives the maximum is a function of the height of the horizontal antenna. At lesser degrees $\theta$, the field decreases; at greater degrees $\theta$, the field also decreases such that little or no field is noted at $\theta$=90°.

Figure 6:
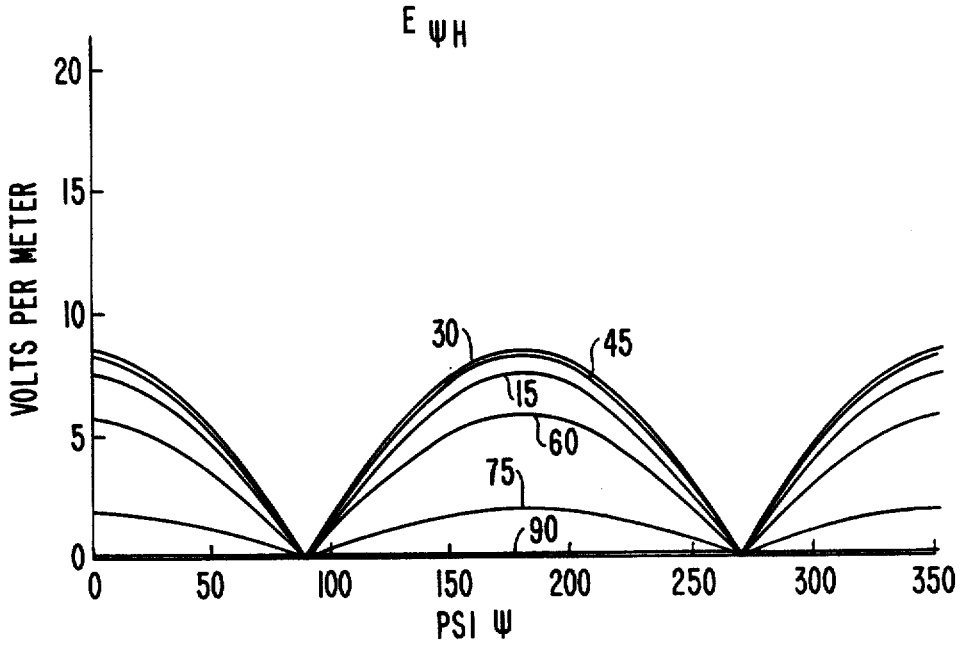
FIG. 6 shows the $\theta$ and $\psi$ distribution of the component of field strength, $E_{\psi H}$ from a short, horizontal, center fed antenna.

FIG. 6 shows the $\psi$ component of field strength $E_{\psi H}$ from the horizontal antenna alone operating as described above. The vertical antenna does not radiate a field strength component in the $\psi$ direction, thus, the $\psi$ component shown here is also that for the complete system when operating as described above.

Figure 7:
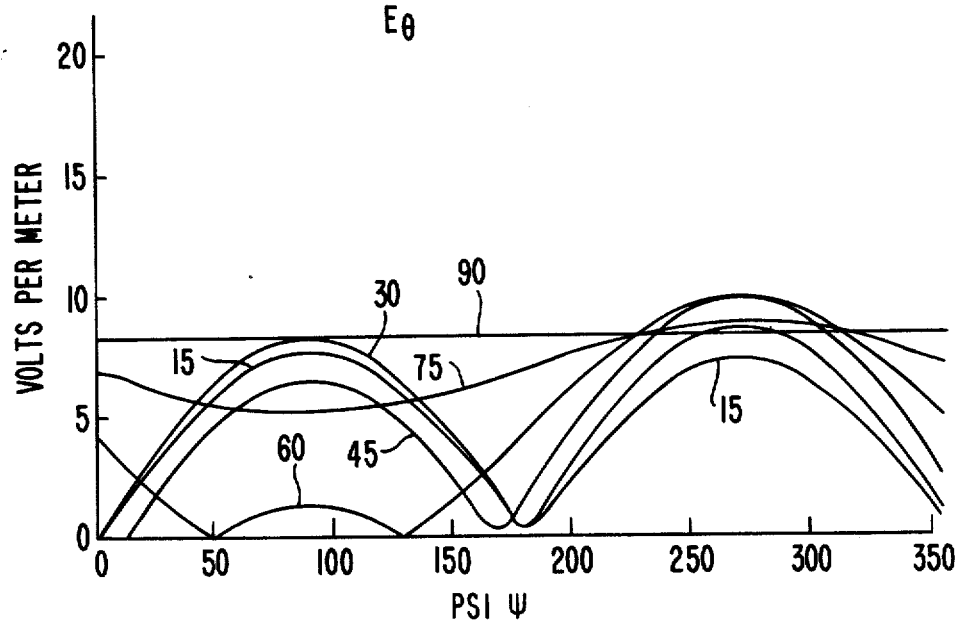
FIG. 7 shows the $\theta$ and $\psi$ distribution of the component of field strength, $E_{\theta}$ from the combination of the vertical antenna whose $\theta$ pattern is shown in FIG. 4 and the horizontal antenna whose $\theta$ component is shown in FIG. 5.

FIG. 7 shows the $\theta$ component of field strength from the complete system operating as described above. FIG. 7 is a vector combination of FIGS. 4 and 5 wherein the field strength $E_\theta$ is the value of the vector sum of $E_{\theta H}$ and $E_{\theta V}$. The vector combination includes both amplitude and phase of the signals at the various observation points.

It is also necessary to determine the proscribed angle of elevation (the 90° complement of $\theta$) ionospheric reflection which is determined by the station separation when interference is to be reduced by reduction of the sky wave signal. The Federal Communications Commission specifies by a graph the pertinent angle of elevation of the ionospheric reflection for medium wave propagation. It is the sky wave at this angle which is proscribed. The graph assumes a standard height for the ionosphere and is applicable to medium wavelength or medium frequency bandwidth transmission stations. The pertinent angle of radiation can be calculated from the following expression.

$$\theta = \sin^{-1}(W) \text{ degrees}$$

where Eq. 5

$W=1.0173(\sin\ 0.00724D)\div(1.96632-196603\cos 0.00724D)^{\frac{1}{2}}$ (calculations are in degrees).

Figure 8:
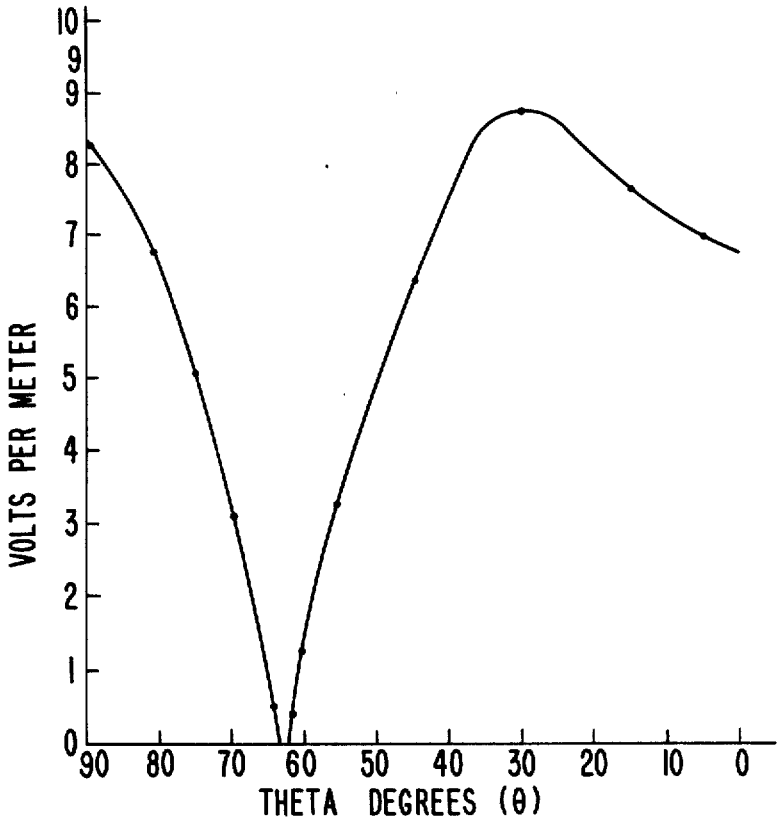
FIG. 8 shows the vertical pattern of the $\theta$ component of radiation from the complete antenna system in the $\psi$ direction of 90 degrees.

From a more detailed set of calculations similar to those used to obtain FIG. 7, a vertical pattern of the component of field strength can be made for a specific bearing $\psi$. FIG. 8 depicts such a pattern for the above described antenna and the bearing is 90 degrees $\psi$ which is in the direction parallel to the horizontal antenna (along the Y axis). Using equation 5 and the parameters of the antenna system described above, it is found that the value of $\theta$ for the exemplary distance is 62.9 degrees. The angle of elevation is 27.1 degrees. This value matches the minimum radiation angle for the example antenna. For this cancellation of radiation to occur, the current in the horizontal antenna (and consequently the magnitude of radiation) must be adjusted to give the proper value of radiation at the proscribed angle $\theta$ and the phase of the radiation must be opposite to that from the vertical antenna. For the exemplary system, the phase of the current in the horizontal antenna leads, by 90 degrees, the phase of the current in the vertical antenna.

Further, the concept may be combined with conventional directional antennas which in the past have used only vertical elements. In such systems, horizontal elements oriented in various directions may be used on some or all of the vertical elements, they may be supported between the vertical elements both in straight lines or in a "V" shape between vertical elements not in a straight line. The horizontal elements may consist of unequal lengths on both sides of a feed point as well as more than one antenna wire on either side.

To apply the invention to directional systems more complicated than the example cited, due care is required to balance the $\theta$ component from the vertical elements and its phase in the desired directions with the $\theta$ component from the horizontal elements and its phase all in the various directions where control of the high angle radiation is desired.

Figure 9:
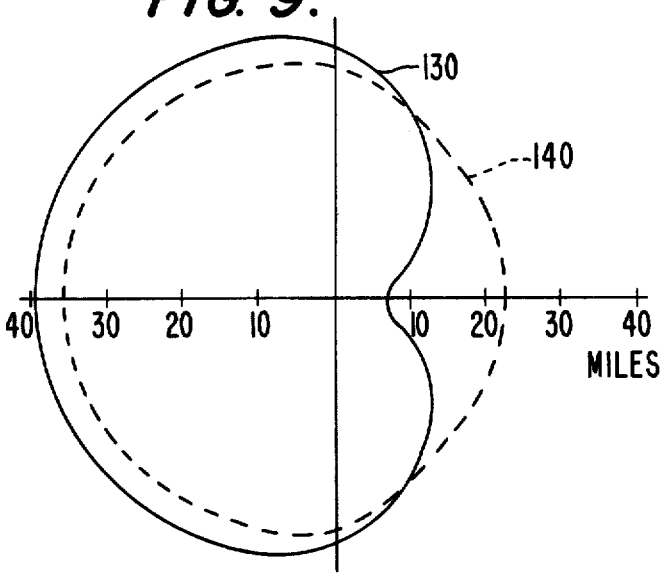
FIG. 9 shows two 2.5 mV/m contours for a station, one using a conventional antenna system and the second using an antenna system per the present invention; and, FIGS. 10A, B and C show schematic representations of antenna systems, the vertical patterns of the $\theta$ component at $\psi=90°$ and the horizontal patterns for those antenna systems.

For a second example, consider the same allocation conditions as described above. Two stations again operating with a power of 1000 watts on 1000 kHz with average soil constants and separated by 260 miles. Station A was the last station anthorized and is required to protect the 2.5 mV/m contour of station B. In order to afford this protection, station A uses a two element directional antenna consisting of two 90 degree vertical antennas spaced 90 electrical degrees apart and oriented along the line joining the stations and with the antenna furthest from station B using a current 0.9 times that in the reference antenna and with a phase lagging that in the reference antenna by 90 degrees. FIG. 9 shows the location of station A 2.5 mV/m contour 130 as initially operating with a conventional directional antenna system having two vertical antenna elements.

The addition of a horizontal element with a half length of 45 degrees and at a height of 45 degrees to the non-reference antenna (one of the vertical antennas is a reference; the other is non-reference) and carrying a loop current of 6 times that in the reference antenna and with a phase that leads the reference antenna loop current by 163 degrees results in a more nearly non-directional antenna pattern and an improved service area. The contour 140 when operating with this antenna is also shown on FIG. 9. The addition of more service area near to the transmitter is generally beneficial.

Figure 10A:
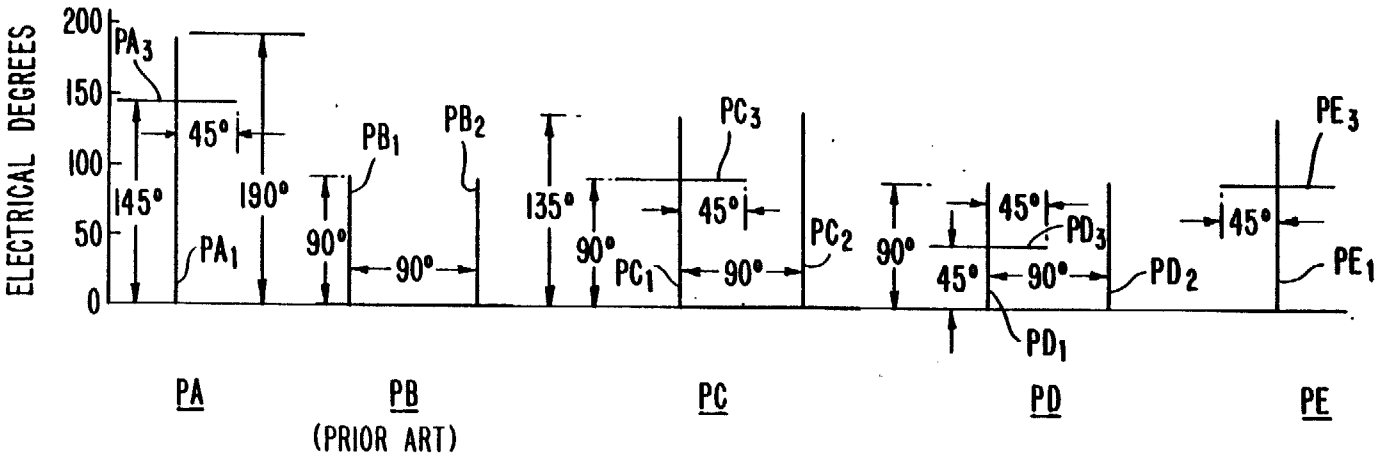
Figure 10C:
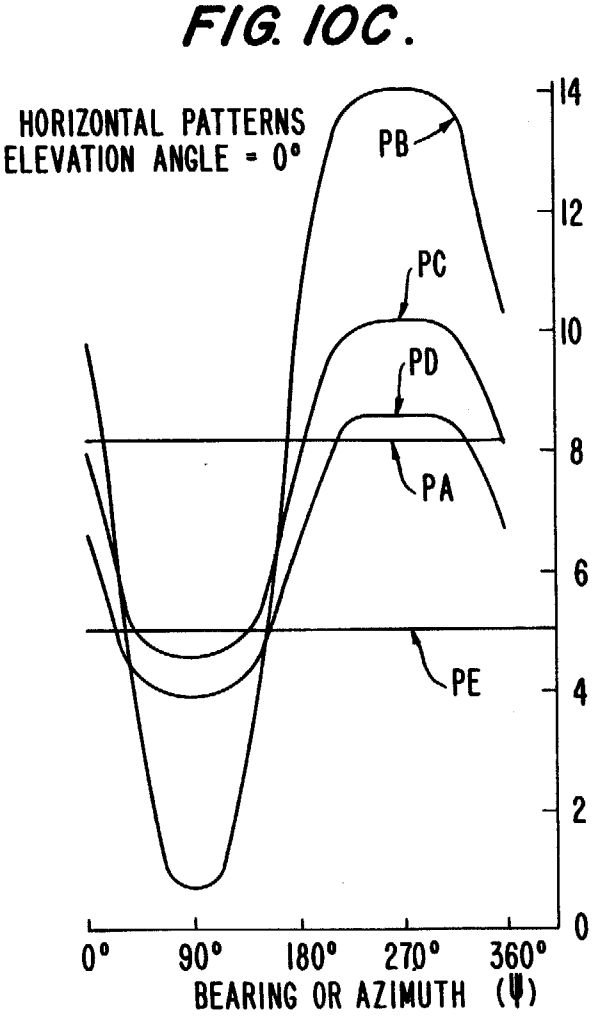
Figure 10B:
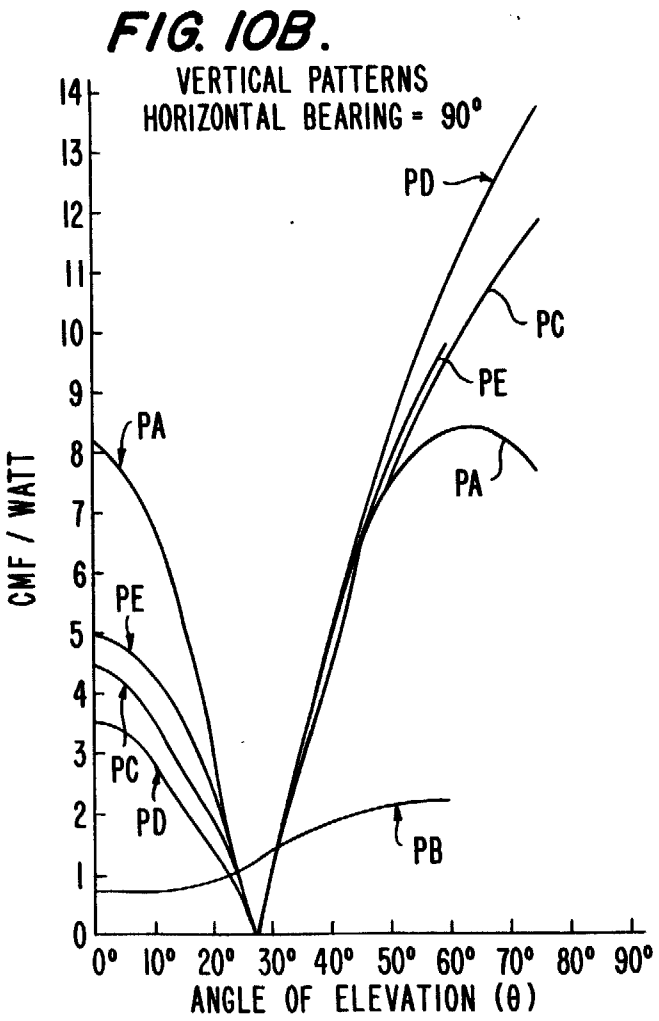

FIGS. 10A, 10B and 10C show antenna schematics for antenna systems PA, PB, PC, PD and PE; show the vertical patterns for those antenna systems at $\psi=90°$; and show the horizontal patterns at $\theta=90°$ or elevation of 0°, respectively. Antenna system PA is substantially similar to the earlier described antenna system illustrated in FIG. 3, the loop current in vertical antenna $PA_1$ is 1.0 amphere, the current in horizontal antenna $PA_3$ is 5.0 ampheres and the phase relationship is 0° vs 90°, $PA_1$ to $PA_3$. $PA_3$ is 145 electrical degrees above ground and has a half length of 45 electrical degrees; $PA_1$ is 190 electrical degrees above ground. The measure of the total electromagnetic field signal radiated in the horizontal plane has an average value of 8.18 rms. The vertical field strength pattern in cmf per watt at $\psi=90°$ is shown in FIG. 10B for the antenna systems and the horizontal field strength pattern for $\theta=90°$ or 0° elevation is shown in FIG. 10C.

Throughout FIG. 10A, the vertical antenna elements are designated with subscript "1" and ¢2" and the horizontal antenna elements are designated with subscript "3".

Antenna system PB is a conventional dual vertical antenna system. For antenna systems PA and PE, horizontal field strengths at $\theta=90°$ are constant (FIG. 10C) regardless of the azimuth direction. However, antenna systems PB, PC and PD have varying field strengths dependent upon the azimuth direction.

The following table presents the loop current I, the phase relationship (ph) and the average total electromagnetic field strength radiated in the horizontal plane (rms) for the illustrated antenna systems. P-1 corresponds to $PA_1$, $PB_1$, etc.; P-2 to $PB_2$, $PC_2$, etc.; P-3 to $PA_3$, $PC_3$, etc.

| | PA 1/Ph | PB 1/Ph | PC 1/Ph | PD 1/Ph | PE 1/Ph |
|---|---|---|---|---|---|
| P-1 | 1.0/0° | 1.0/0° | 1.0/0° | 1.0/0° | 1.0/0° |
| P-2 | — | 0.9/90° | 0.4/90° | 0.4/90° | — |
| P-3 | 5.0/90° | — | 5.0/253° | 6.0/253° | 7.7/90° |
| rms | 8.18 | 9.88 | 7.90 | 6.36 | 5.02 |

By selecting the proper antenna system, the ground or surface night range of the transmitting station can be tailored to the total service. The horizontal and vertical field strength patterns illustrated in FIGS. 10B and 10C are obtained by initially starting with antenna systems such as PA and PE combining them with other vertical antenna and calculating the vertical and horizontal field patterns, adjusting the loop current and phase relationship of the horizontal antenna to obtain the cancellation of $E_{\theta V}$ with $E_{\theta H}$ at the proscribed angle of elevation (approximately 27.1°), comparing the horizontal field pattern to the previous pattern, and modifying variables to obtain an optimum horizontal field pattern and cancellation at the proscribed angle of elevation.

It has been theoretically found that the optimum height for the horizontal antenna is 180 electrical degrees above ground because, at this height, the radiation emitted upward is minimized. Also, it has been calculated that, with the use of two or more vertical antennas, better efficiency is obtained when the horizontal antenna is located at the vertical antenna carrying the lesser current, i.e., the antenna generating lesser degrees of radiation. The directional orientation, i.e., bearing, of the horizontal antenna affects the asymmetry of the overall radiation pattern of the system when using two vertical antennas. By changing or adding a second horizontal wire to the horizontal antenna extending over a half length of the horizontal antenna, improved control of the overall radiation pattern has been noted.

The present invention is not to be limited to the embodiments illustrated but only as defined in the appended claims.

I claim:

1. An antenna system for controlling the sky wave generated by a station in one or more azimuth directions psi and zenith directions theta comprising:

one or more vertical antenna configurations generating an electromagnetic field E, said field having a field component $E_{\theta V}$ determined with respect to the azimuth direction psi and the zenith direction theta;

one or more horizontal antenna configurations generating another electromagnetic field, said another field having a further field component $E_{\theta H}$ determined with respect to the zenith direction theta and azimuth direction psi and having an additional field component $E_{\psi H}$ oriented in the psi direction; and, means for adjusting the magnitude of $E_{\theta H}$ and the phase of $E_{\theta H}$ generated by said horizontal antenna configuration for one or more angles of elevation of the stations's ionospheric reflection corresponding to said azimuth directions psi such that $E_{\theta V}$ is substantially cancelled out by $E_{\theta H}$ at said angles of elevation and azimuth.

2. An antenna system for controlling the sky wave generated by a first station transmitting radio frequency signals, said first station having a proscribed angle of elevation for ionospheric reflection in relation to another station which is a predetermined distance from said first station, the antenna system comprising:

a vertical antenna means for generating an electromagnetic field E carrying said radio frequency signals, said field having a field component $E_{\theta V}$ determined with respect to a zenith direction theta;

a horizontal antenna means for generating another electromagnetic field carrying said radio frequency signals, said another electromagnetic field having a further field component $E_{\theta H}$ determined with respect to said zenith direction theta; and means for setting the magnitude and phase of said further field component $E_{\theta H}$ generated by said horizontal antenna means such that at said proscribed angle of elevation for ionospheric reflection said further field component $E_{\theta H}$ substantially cancels out said field component $E_{\theta V}$ generated by said vertical antenna means.

3. An antenna system as claimed in claim 2 including means for supplying a current carrying said radio frequency signals to said vertical antenna means and said horizontal antenna means; and wherein said means for setting the magnitude and phase is interposed between said means for supplying current and said horizontal antenna means and includes means for modifying the current supplied to said horizontal antenna means such that the horizontal antenna current has a predetermined magnitude and a predetermined phase with respect to the current supplied to said vertical antenna means.

4. An antenna system as claimed in claim 3 wherein said vertical antenna means includes a plurality of vertical antennas, said plurality of vertical antennas generating said field component $E_{\theta V}$; said horizontal antenna means includes a plurality of horizontal antennas generating said further field component $E_{\theta H}$; and said means for setting includes a plurality of means for modifying the respective currents supplied to corresponding horizontal antennas of said plurality of horizontal antennas.

5. An antenna system as claimed in claim 3 wherein the length and the physical positioning of said horizontal antenna means in relation to said vertical antenna means is predetermined to obtain cancellation of said field component $E_{\theta V}$ at said proscribed angle by said further field component $E_{\theta H}$ and said means for setting the magnitude and phase of said further field component $E_{\theta H}$ is affected thereby.

6. An antenna systems as claimed in claim 5 wherein said horizontal antenna means is positioned 180 electrical degrees above ground.

7. An antenna system as claimed in claim 5 wherein said horizontal antenna means is at a predetermined directional orientation with respect to said another station to obtain cancellation by said further field component $E_{\theta H}$ of said field component $E_{\theta V}$ at said proscribed angle.

8. A method of limiting the sky wave radiation from a medium wave antenna system of a first station which transmits radio frequency signals and which is assigned a proscribed angle of elevation for ionospheric reflection based upon the distance between said first station and another station, the method comprising the steps of:

providing a vertical antenna configuration;

providing a horizontal antenna configuration;

generating from said vertical antenna configuration an electromagnetic field E carrying said radio frequency signals, said field having a field component $E_{\theta V}$ in zenith direction theta;

generating from said horizontal antenna configuration another electromagnetic field carrying said radio frequency signals, said another electromagnetic field having a further field component $E_{\theta H}$ in said zenith direction theta;

modifying the magnitude and phase of said further field component $E_{\theta H}$ such that at said proscribed angle of elevation for ionospheric reflection said further field component $E_{\theta H}$ substantially cancels out said field component $E_{\theta V}$.

9. A method as claimed in claim 8 wherein said vertical and said horizontal antenna configurations are fed with corresponding loop currents carrying said radio frequency signals and the step of modifying includes energizing said horizontal antenna configuration with a specified loop current having a predetermined magnitude with respect to the corresponding loop current fed to said vertical antenna configuration and having a predetermined phase with respect to said corresponding loop current.

*10. An antenna system for controlling the sky wave generated by a first station transmitting radio frequency signals, said first station having a proscribed angle of elevation for ionospheric reflection in relation to another station which is a predetermined distance from said first station, the antenna system comprising:*

*a first antenna means (antenna means A) oriented in a direction having a vertical component for generating an electromagnetic field E from said vertical component carrying said radio frequency signals, said field from said vertical component having a field component $E_{\theta A}$ determined with respect to a zenith direction theta;*

*a second antenna means (antenna means B) oriented in a direction having a horizontal component for generating another electromagnetic field from said horizontal component carrying said radio frequency signals, said another electromagnetic field from said horizontal component having a further field component $E_{\theta B}$ determined with respect to said zenith direction theta; and*

*means for setting the magnitude and phase of said field components $E_{\theta A}$ and $E_{\theta B}$ with respect to each other such that at said proscribed angle of elevation for ionospheric reflection said field component $E_{\theta A}$ substantially cancels out said further field component $E_{\theta B}$.*

*11. An antenna system as claimed in claim 10 including means for supplying a current carrying said radio frequency signals to said first antenna means and said second antenna means; and wherein said means for setting the magnitude and phase is interposed between said means for supplying current and said second antenna means and includes means for modifying the current supplied to said second antenna means such that the second antenna current has a predetermined magnitude and a predetermined phase with respect to the current supplied to said first antenna means.*

*12. An antenna system as claimed in claim 11 wherein the length and the physical positioning of said second an-*

*tenna means in relation to said first antenna means is predetermined to obtain cancellation of said field component $E_{\theta A}$ at said proscribed angle by said further field component $E_{\theta B}$ and said means for setting the magnitude and phase of said further field component $E_{\theta B}$ is affected thereby.*

*13. An antenna system as claimed in claim 12 wherein said second antenna means is at a predetermined directional orientation with respect to said another station to obtain cancellation by said further field component $E_{\theta B}$ of said field component $E_{\theta A}$ at said proscribed angle.*

*14. A method of limiting the sky wave radiation from a medium wave antenna system of a first station which transmits radio frequency signals and which is assigned a proscribed angle of elevation for ionospheric reflection based upon the distance between said first station and another station, the method comprising the steps of:*

*providing a first antenna configuration (antenna A) oriented in a direction having a vertical component;*

*providing a second antenna configuration (antenna B) orientation in a direction having a horizontal component;*

*generating from the vertical component of said first antenna configuration an electromagnetic field E carrying said radio frequency signals, said field having a field component $E_{\theta A}$ in zenith direction theta;*

*generating from the horizontal component of said second antenna configuration another electromagnetic field carrying said radio frequency signals, said another electromagnetic field having a further field component $E_{\theta B}$ in said zenith direction theta;*

*modifying the magnitude and phase of said field components $E_{\theta A}$ and $E_{\theta B}$ with respect to each other such that at said proscribed angle of elevation for ionospheric reflection said further field component $E_{\theta B}$ substantially cancels out said field component $E_{\theta A}$.*

*15. A method as claimed in claim 14 wherein said first and said second antenna configurations are fed with corresponding loop currents carrying said radio frequency signals and the step of modifying includes energizing one of said first and second antenna configurations with a specified loop current having a predetermined magnitude with respect to the corresponding loop current fed to the other of said antenna configurations and having a predetermined phase with respect to said corresponding loop current.*

* * * * *